(12) United States Patent
Huber

(10) Patent No.: US 6,712,573 B1
(45) Date of Patent: Mar. 30, 2004

(54) IRON MOUNTING FOR DETACHABLY FIXING TO A PIECE OF FURNITURE

(75) Inventor: Edgar Huber, Hard (AT)

(73) Assignee: Julius BLUM Gesellschaft m.b.H., Hochst (AT)

( * ) Notice: Subject to any disclaimer, the term of this patent is extended or adjusted under 35 U.S.C. 154(b) by 0 days.

(21) Appl. No.: 10/070,685
(22) PCT Filed: Oct. 25, 2000
(86) PCT No.: PCT/AT00/00277
§ 371 (c)(1), (2), (4) Date: Mar. 8, 2002
(87) PCT Pub. No.: WO01/33088
PCT Pub. Date: May 10, 2001

(30) Foreign Application Priority Data

Nov. 4, 1999 (AT) .............................................. 1852/99

(51) Int. Cl.[7] .............................................. F16B 13/06
(52) U.S. Cl. ..................... 411/71; 411/15; 411/80.6; 403/282
(58) Field of Search ........................ 411/15, 44, 71–74, 411/49–51, 55, 57.1, 60.1, 80.5, 80.6; 403/282, 315–318; 16/383

(56) References Cited

U.S. PATENT DOCUMENTS

| | | | | |
|---|---|---|---|---|
| 4,854,793 A | * | 8/1989 | Ollivier | |
| 4,915,343 A | * | 4/1990 | Terlecke | |
| 5,044,849 A | * | 9/1991 | Staike | |
| 5,246,322 A | * | 9/1993 | Salice | |
| 5,669,108 A | * | 9/1997 | Ferrari | |
| 6,279,200 B1 | * | 8/2001 | Ferrari | |
| 6,287,044 B1 | * | 9/2001 | Huber | |

FOREIGN PATENT DOCUMENTS

| | | |
|---|---|---|
| AT | 295348 | 4/1971 |
| AT | 326522 | 12/1975 |
| DE | 2457172 | 6/1976 |
| DE | 3114365 | 2/1983 |
| DE | 3717376 | 1/1988 |
| FR | 2502675 | 10/1982 |
| GB | 1109570 | 4/1968 |

* cited by examiner

Primary Examiner—Flemming Saether
(74) Attorney, Agent, or Firm—Wenderoth, Lind & Ponack L.L.P.

(57) ABSTRACT

A fitting to be removably fastened to a furniture part includes a body, at least one expanding plug anchored in the body, and a pin-shaped expansion part. The body has a projecting supporting throat to protrude into a cavity in the furniture part. The supporting throat has at least one recess into which a projection on the expanding plug extends.

20 Claims, 6 Drawing Sheets

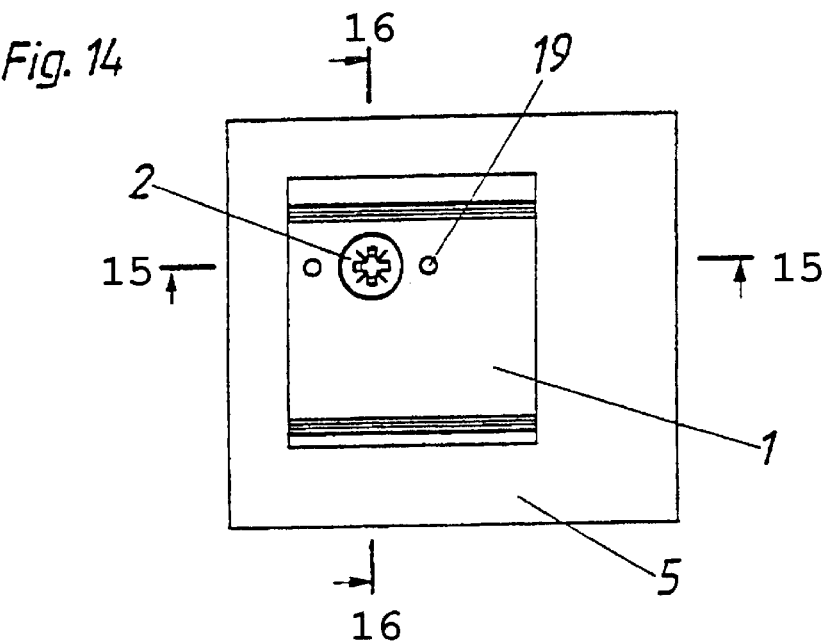
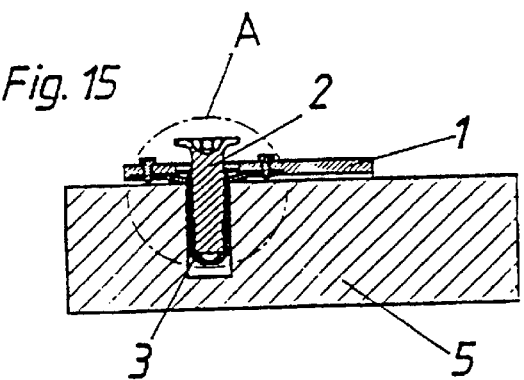
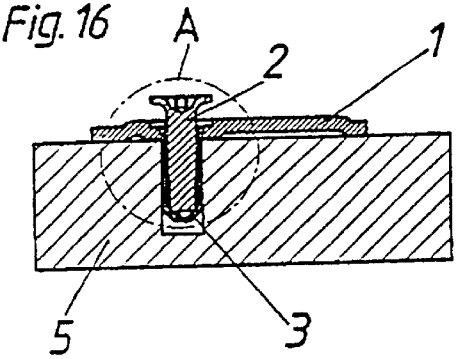
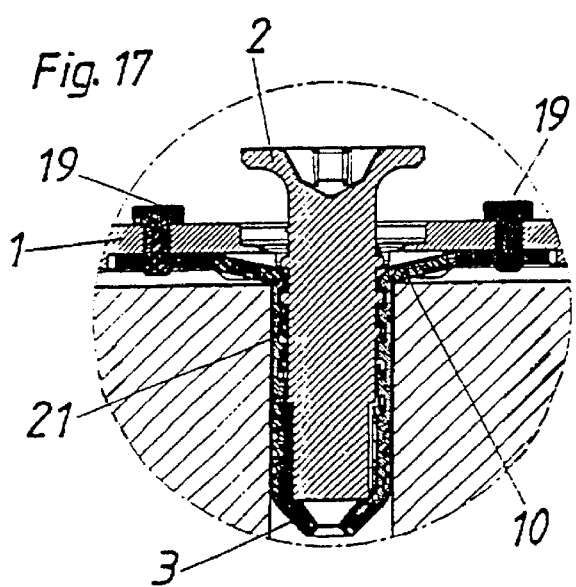
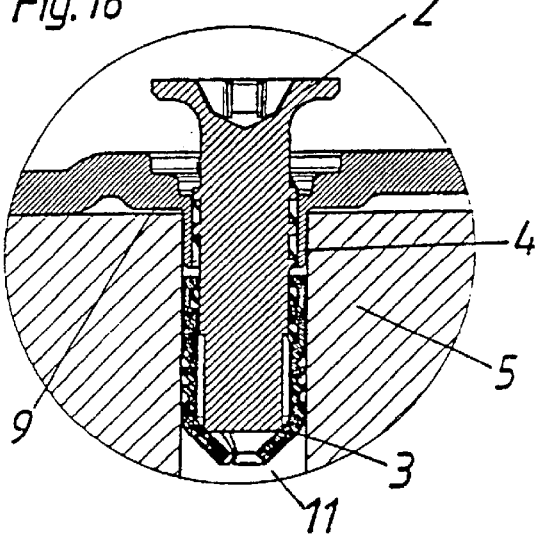

IRON MOUNTING FOR DETACHABLY FIXING TO A PIECE OF FURNITURE

BACKGROUND OF THE INVENTION

The present invention relates to a fitting to be removably fixed to a furniture part, including a preferably plate-shaped body lying against the furniture part. At least one expanding plug is anchored in the body of the fitting, and the plug can be inserted into a bore of the furniture part. A pin-shaped expansion part for the expanding plug protrudes through an aperture in the body of the fitting.

A base plate for a hinge is known from AT-PS 326 522, and the base plate has supporting plugs that are received within cavities in the furniture parts. This base plate is fixed by screws onto the furniture part.

SUMMARY OF THE INVENTION

The object of the invention is to improve anchorage in the furniture part using a fitting of the type described in the introduction that is fastened onto a furniture part by a dowel-type expanding plug.

The object of the invention is solved in that on the body of the fitting there is configured at least one projecting supporting throat, known per se, which when assembled projects into a corresponding cavity in the furniture part and is inserted into the expanding plug. The supporting throat is provided with at least one recess into which a projection configured on the expanding plug protrudes.

Two recesses can be advantageously arranged diametrically opposite to one another in the supporting throat.

In an embodiment of the invention, the projection or projections is/are arranged laterally on an area of the throat of the expanding plug that has a reduced diameter in comparison to an adjacent section of the expanding plug.

According to a further embodiment of the invention, the at least one recess extends over the entire height of the supporting throat, and two axial projections are arranged on the expanding plug that protrude into the two recesses in the supporting throat.

Advantageously, two arms standing out at an angle to the body of the fitting can be molded on the projections, and the arms are riveted to the body of the fitting.

BRIEF DESCRIPTION OF THE DRAWINGS

Different embodiments of the invention will hereinafter be described with reference to the attached drawings in which:

FIG. 9 is a section view similar to FIG. 5, in which the expansion part is completely screwed-in;

FIG. 14 is a plan view of the fitting of the second embodiment;

FIG. 15 is a section view through the line 15—15 of FIG. 14;

FIG. 16 is a section view through line 16—16 of FIG. 14;

FIG. 17 is a detail view of section A of FIG. 15;

FIG. 18 is a detail view of section A of FIG. 16;

FIG. 20 is a section view similar to that of FIG. 16, in which the expansion part is completely screwed in;

DETAILED DESCRIPTION OF THE INVENTION

In the embodiments shown, the fitting according to the invention is composed of a plate-shaped body 1 configured, for example, as a base plate for the arm of a hinge, an expanding plug 3, and a screw-shaped expansion part 2.

In the embodiment according to FIGS. 1 to 10, the expanding plug 3 is fabricated from plastics. In the embodiment according to FIGS. 11 to 22, however, the plug 3 is fabricated from quenched and drawn or hardened steel.

The metallic expanding plug 3 is advantageously provided with a phosphate coating. The wall thickness of the metallic expanding plug 3 can thus be kept below 1 mm, and preferably between 0.7 and 0.8 mm. In both embodiments, the expansion part 2 can also be fabricated from quenched and drawn or hardened steel.

Figure 2:
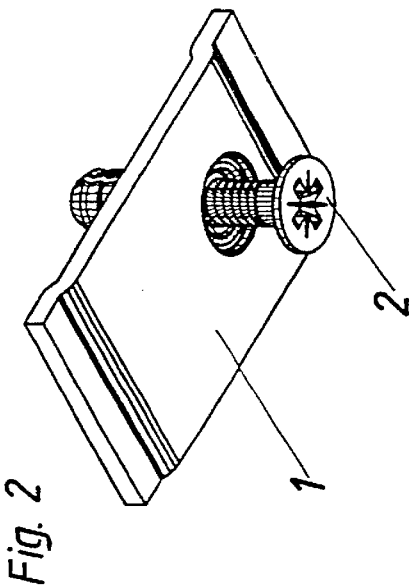
FIG. 2 is a perspective view of the fitting seen from above.
Figure 3:
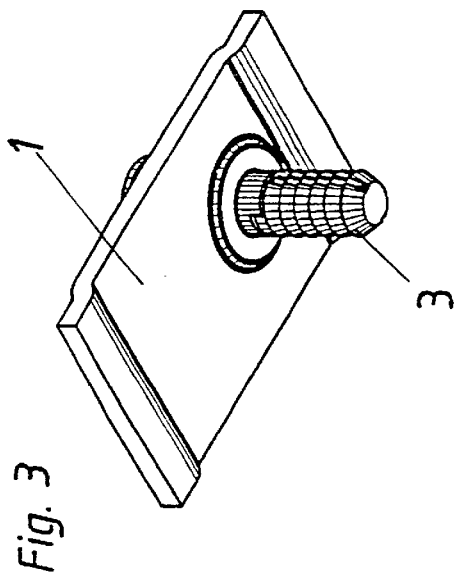
FIG. 3 is a perspective view of the fitting seen from below.
Figure 1:
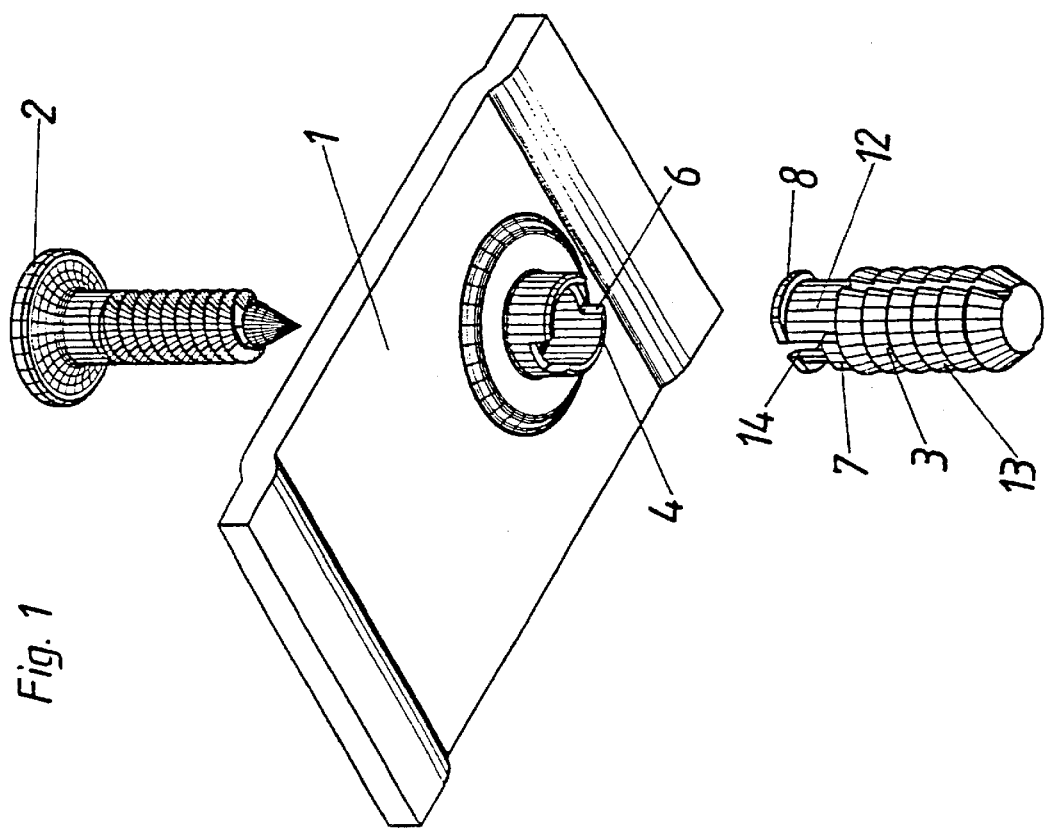
FIG. 1 is an exploded view of an embodiment of a fitting according to the invention.
Figure 4:
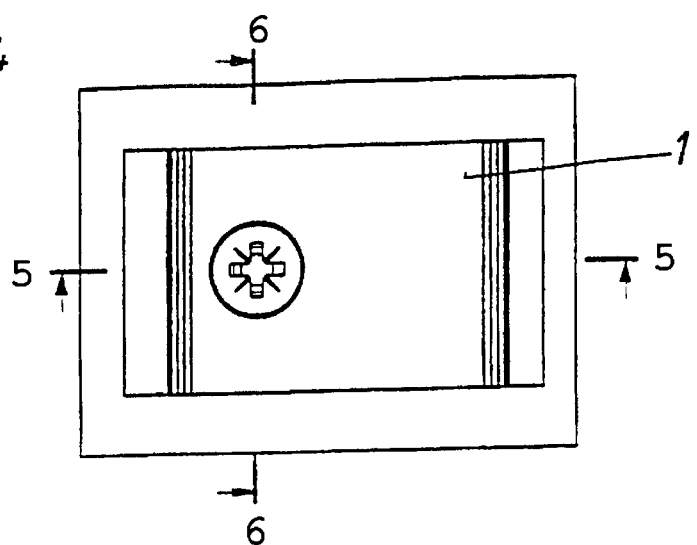
FIG. 4 is a plan view of the fitting according to the invention.

The body 1 has on its side facing the furniture part 5 a projecting supporting throat 4 that—when assembled—protrudes into the bore 11 in the furniture part 5 that receives the expanding plug 3. As shown in FIG. 1, the supporting throat has a base end connected to the body 1, and has a distal end opposite the base end (and farthest from the body).

The supporting throat 4 has two recesses 6 diametrically opposite to one another, in which, when the fitting is assembled, projections 7, 17 of the expanding plug 3 are received in a form-fitting manner. As also shown in FIG. 1, each of the recesses extends axially from the distal end of the supporting throat 4 toward the base end of the supporting throat 4.

The projections 7 of the expanding plug 3 made of plastics are located in the proximity of a small-diameter throat area 12 of the expanding plug 3 having a lesser diameter than the adjacent large diameter gripping area, which has gripping ribs 13, of the expanding plug 3.

The area 12 is provided with slits 14 that facilitate securing of the expanding plug 3 into the body 1.

The area 12 (or, more generally, the expanding plug 3) has radially projecting edge 8 at its free end. When the fitting is assembled, the edge 8 is received in a cavity 15 of the body 1.

Figure 5:
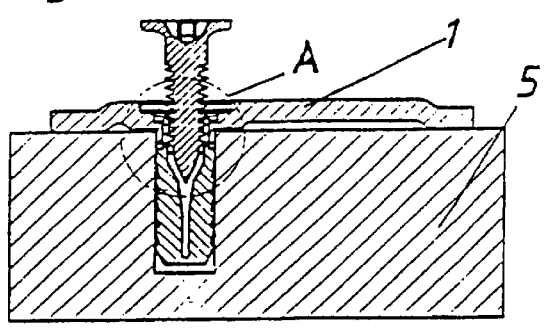
FIG. 5 is a section view taken along line 5—5 of FIG. 4.
Figure 6:
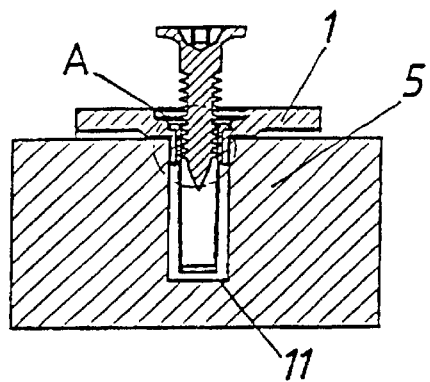
FIG. 6 is a section view taken along line 6—6 of FIG. 4.
Figure 7:
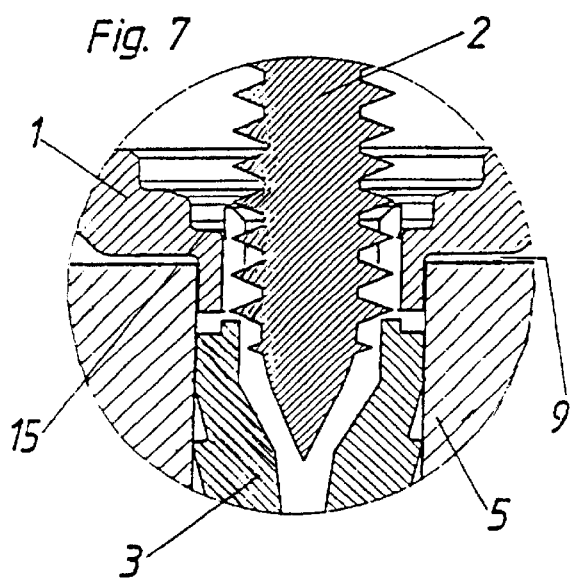
FIG. 7 is a detail view of section A of FIG. 5.
Figure 8:
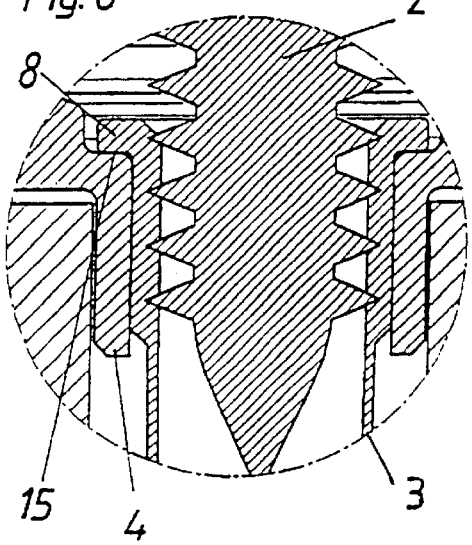
FIG. 8 is a detail view of section A of FIG. 6.

The fitting according to the invention is positioned in its assembled form as shown in FIGS. 5 and 6. When the body 1 is initially placed on the furniture part 5, a thickened area of the body 1 that surrounds the expanding plug 3 and the expansion part 2 is located at a distance 9 from the side wall of the furniture 5.

Figure 9:
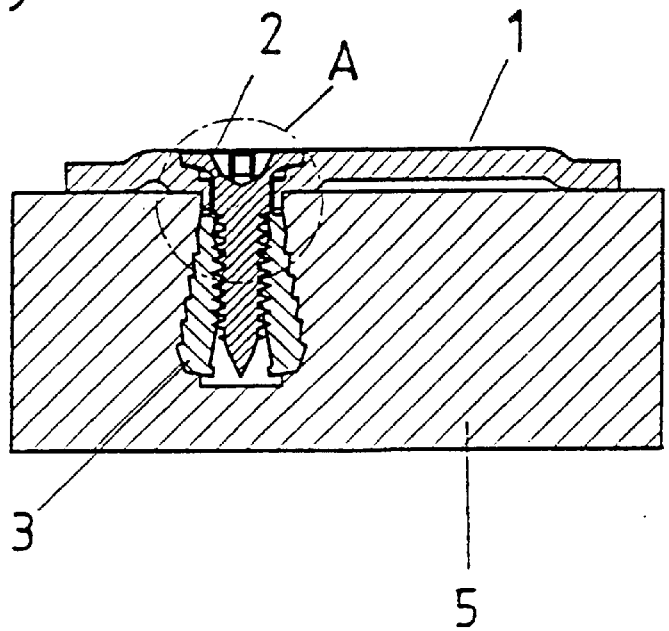
Figure 10:
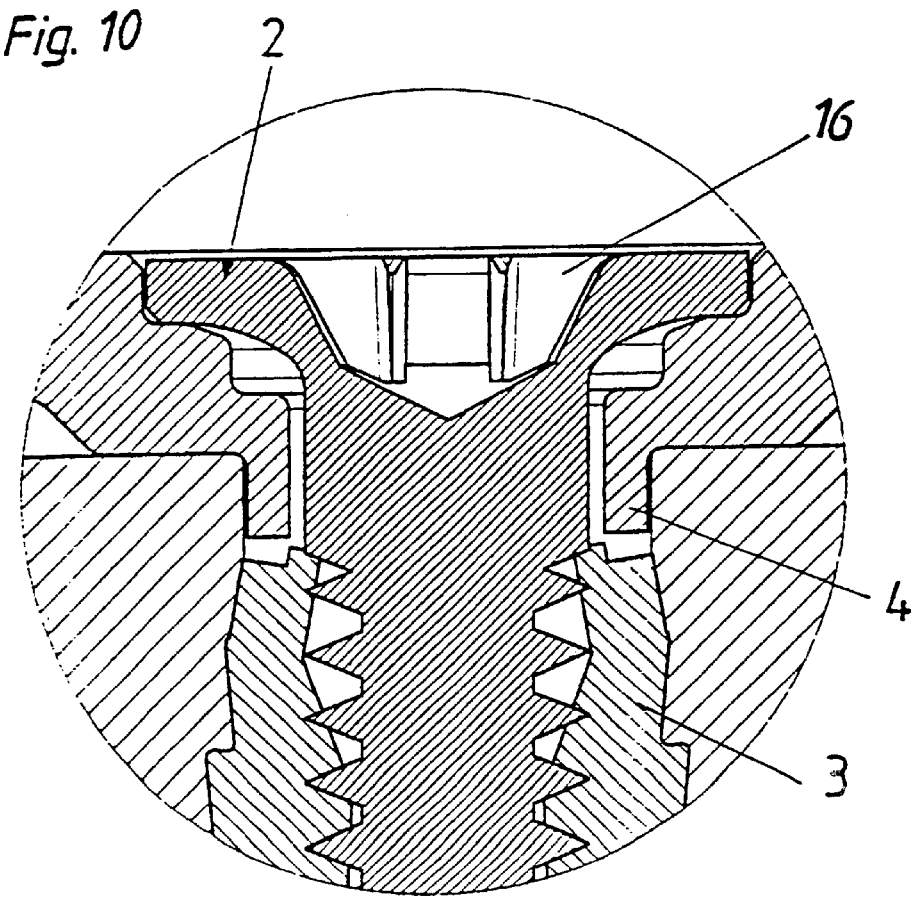
FIG. 10 is a detail view of section A of FIG. 9.
Figure 11:
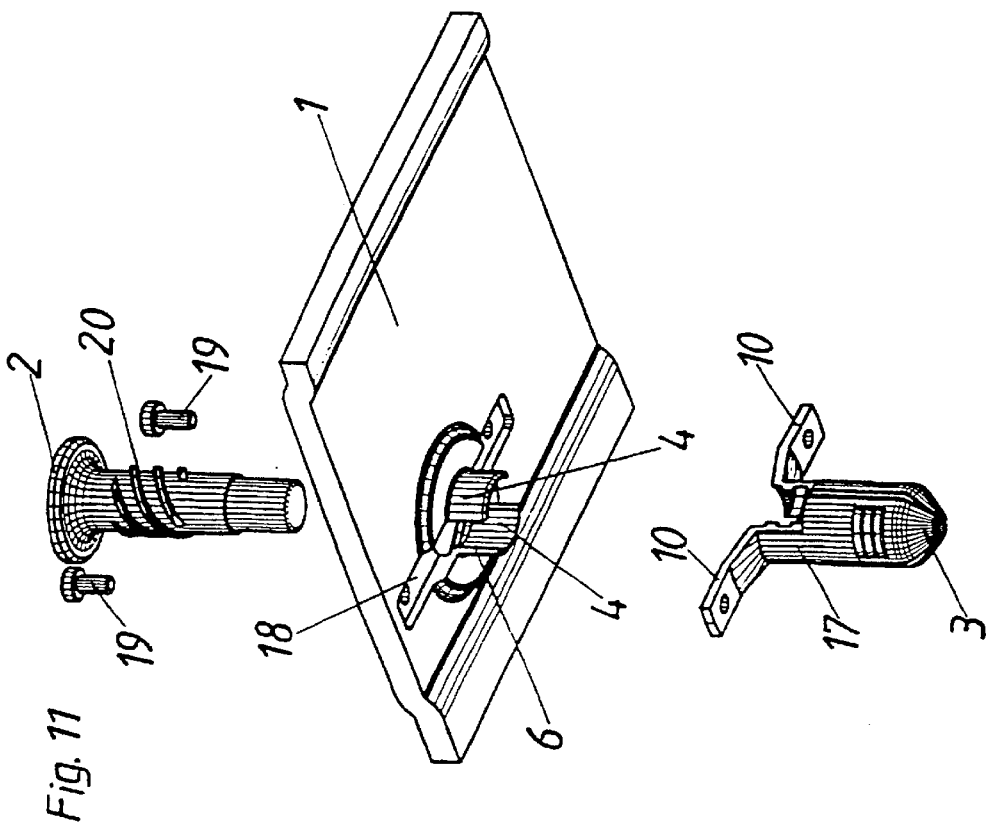
FIG. 11 is an exploded view of a second embodiment of the fitting according to the invention.
Figure 12:
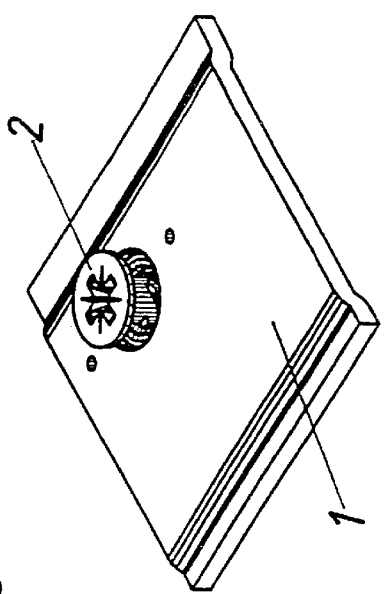
FIG. 12 is an exploded view of the fitting of the second embodiment seen from above.

If, as shown in FIGS. 9 and 10, the screw-like expansion part 2 is screwed further into the expanding plug 3, the body 1 is pressed directly onto the furniture part 5. The body 1 is thus held against the furniture part 5 under compression.

In order to make possible the screwing of the screw-like expansion part 2, the expansion part 2 has a recess 16 on its head end for receiving a crosshead screwdriver.

In the embodiment according to FIGS. 11 to 22, the expanding plug 3 is configured as a steel sleeve. The body of the fitting 1 is provided with a supporting throat 4 that again has two recesses 6 diametrically opposite one another.

In these embodiments, the recesses 6 are configured continuously. In other words, the recesses extend over the entire height of the supporting throat 4.

Figure 13:
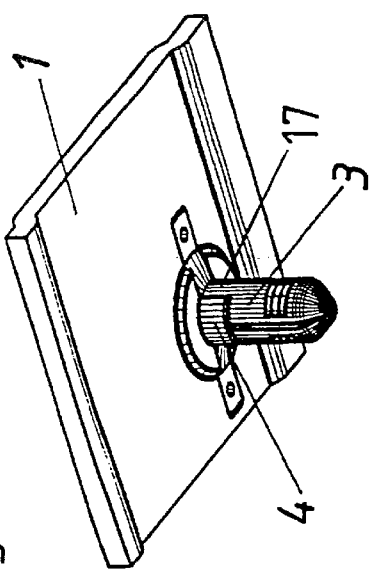
FIG. 13 is an exploded view of the fitting of the second embodiment seen from below.
Figure 19:
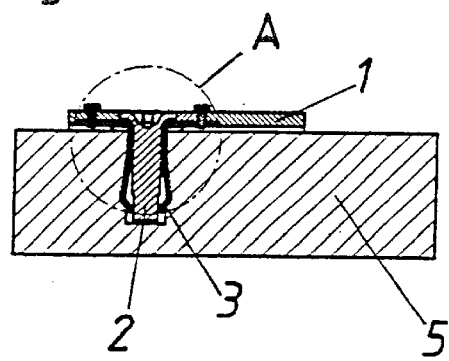
FIG. 19 is a section view similar to that of FIG. 15, in which the expansion part is completely screwed-in to the furniture part.
Figure 20:
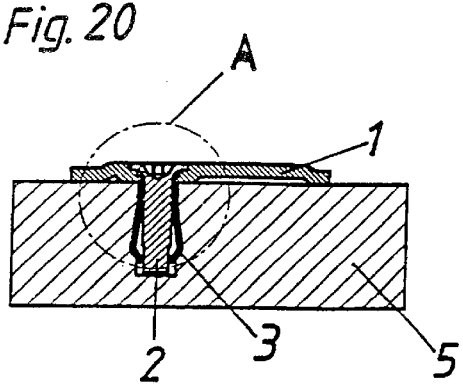
Figure 21:
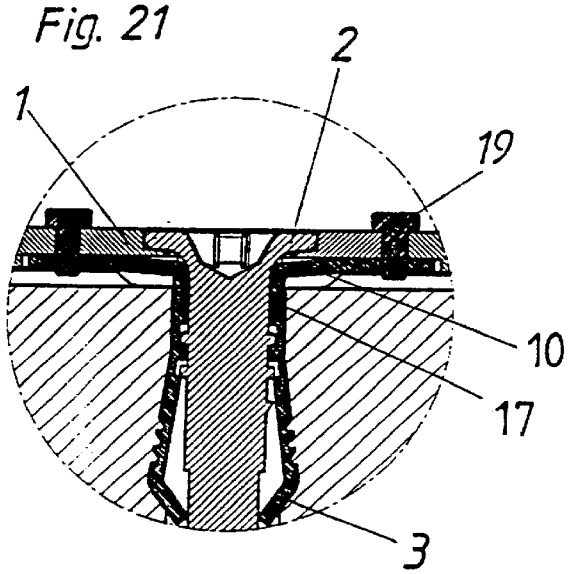
FIG. 21 is a detail view of section A of FIG. 19.
Figure 22:
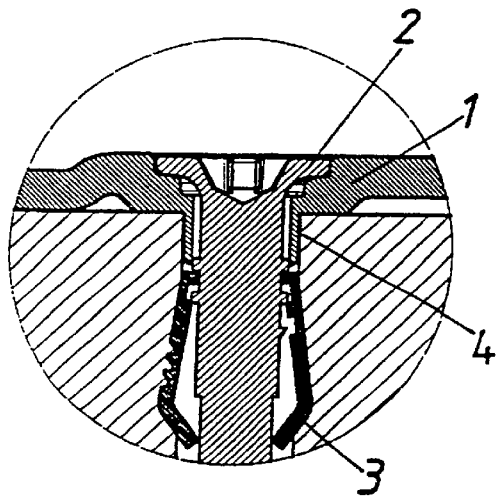
FIG. 22 is a detail view of the section A of FIG. 20.

The expanding plug 3 has, on its end facing towards the body 1, two projections 17 extending axially hat, as can be seen from FIG. 13, protrude into the recesses 6 when assembled and are fully received therein.

At the free ends of the projections 17, tabs 10 are configured so as to extend at an angle with respect to the body 1.

In the assembled state, the tabs 10 are received into grooves 18 of the body 1, and are fixed by rivets 19 to the body of the fitting 1.

The tabs 10 standing out at an angle are elastic so that prior to tensioning (that is to say prior to tightening up the expansion part2), as is visible from FIG. 18, the body 1 is again held at a distance 9 from the furniture part 5. By screwing down the expansion part 2 that is provided with an external thread 20 that engages with an internal thread 21 in the expanding plug 3, the body of the fitting is pressed into direct contact with the furniture part 5. This situation is apparent from FIG. 22.

In order to make bending of the body 1 possible, it is provided with edges. The body of the fitting 1 can be fabricated from metal, preferably steel, and also from plastics material.

What is claimed is:

1. A fitting to be removably fastened to a furniture part, comprising:
   a body to lie on a surface of the furniture part;
   an expanding plug to be anchored to said body and having a projection, said expanding plug being shaped so as to be inserted into a bore of the furniture part;
   an elongated expansion part to be inserted into said expanding plug, said expansion part to protrude through an aperture in said body; and
   a supporting throat projecting from said body and being shaped so as to protrude into the bore of the furniture part, said supporting throat having a base end connected to said body and having a distal end opposite said base end, said supporting throat further having a recess extending in an axial direction of said supporting throat from said distal end toward said base end, said recess being shaped to receive said projection of said expanding plug.

2. The fitting of claim 1, wherein said recess is entirely open at said distal end of said supporting throat so as to receive said projection of said expanding plug, said recess extending around only a portion of a periphery of said distal end of said supporting throat.

3. The fitting of claim 2, wherein said projection is elongated in an axial direction of said expanding plug.

4. The fitting of claim 1, wherein said recess comprises a first recess, said supporting throat further having a second recess extending in an axial direction of said supporting throat from said distal end toward said base end, said first recess and said second recess being arranged diametrically opposite one another at said distal end of said supporting throat.

5. The fitting of claim 1, wherein said projection is arranged on a throat area of said expanding plug having a smaller diameter than an adjacent gripping area of said expanding plug.

6. The fitting of claim 1, wherein said expanding plug has a radially projecting edge to be received within a cavity of said body.

7. The fitting of claim 1, wherein said recess extends in an axial direction over an entire height of said supporting throat.

8. The fitting of claim 1, wherein said recess comprises a first recess, said supporting throat further having a second recess extending in an axial direction of said supporting throat from said distal end toward said base end, said projection of said expanding plug comprising a first projection to be received in said first recess, said expanding plug further having a second projection to be received in said second recess.

9. The fitting of claim 8, wherein a first tab extends from a distal end of said first projection at an angle with respect to said body, and a second tab extends from a distal end of said second projection at an angle with respect to said body, each of said first tab and said second tab to be anchored to said body.

10. The fitting of claim 9, wherein each of said first tab and said second tab is at least partially received within a groove in said body.

11. The fitting of claim 9, wherein each of said first tab and said second tab is riveted to said body.

12. The fitting of claim 1, wherein said body comprises a plate-shaped body.

13. A fitting to be removably fastened to a furniture part, comprising:
   a body to lie on a surface of the furniture part;
   an expanding plug to be anchored to said body and having a pair of projections, said expanding plug being shaped so as to be inserted into a bore of the furniture part;
   an elongated expansion part to be inserted into said expanding plug, said expansion part to protrude through an aperture in said body; and
   a supporting throat projecting from said body and being shaped so as to protrude into the bore of the furniture part, said supporting throat having a base end connected to said body and having a distal end opposite said base end, said supporting throat further having two recesses diametrically opposite one another, each of said pair of projections projecting into a corresponding one of said first recess and said second recess.

14. The fitting of claim 13, wherein each of said first recess and said second recess extends in an axial direction of said supporting throat from said distal end toward said base end.

15. The fitting of claim 14, wherein each of said pair of projections is elongated in an axial direction of said expanding plug.

16. The fitting of claim 13, wherein each of said pair of projections is arranged on a throat area of said expanding plug having a smaller diameter than an adjacent gripping area of said expanding plug.

17. The fitting of claim 13, wherein said expanding plug has a radially projecting edge to be received within a cavity of said body.

18. The fitting of claim 13, wherein each of said two recesses extends in an axial direction over an entire height of said supporting throat.

19. The fitting of claim 13, wherein a first tab extends from a distal end of a first projection of said pair of projections at an angle with respect to said body, and a second tab extends from a distal end of a second projection of said pair of projections at an angle with respect to said body, each of said first tab and said second tab to be anchored to said body.

20. The fitting of claim 19, wherein each of said first tab and said second tab is at least partially received within a groove in said body.

\* \* \* \* \*